April 16, 1968 M. G. ROSANSKY 3,378,406

METAL-OXYGEN-CONTAINING ELECTROCHEMICAL BATTERY

Filed Dec. 30, 1965 5 Sheets-Sheet 1

INVENTOR,
MARTIN G. ROSANSKY

April 16, 1968   M. G. ROSANSKY   3,378,406
METAL-OXYGEN-CONTAINING ELECTROCHEMICAL BATTERY
Filed Dec. 30, 1965   5 Sheets-Sheet 2

INVENTOR,
MARTIN G. ROSANSKY

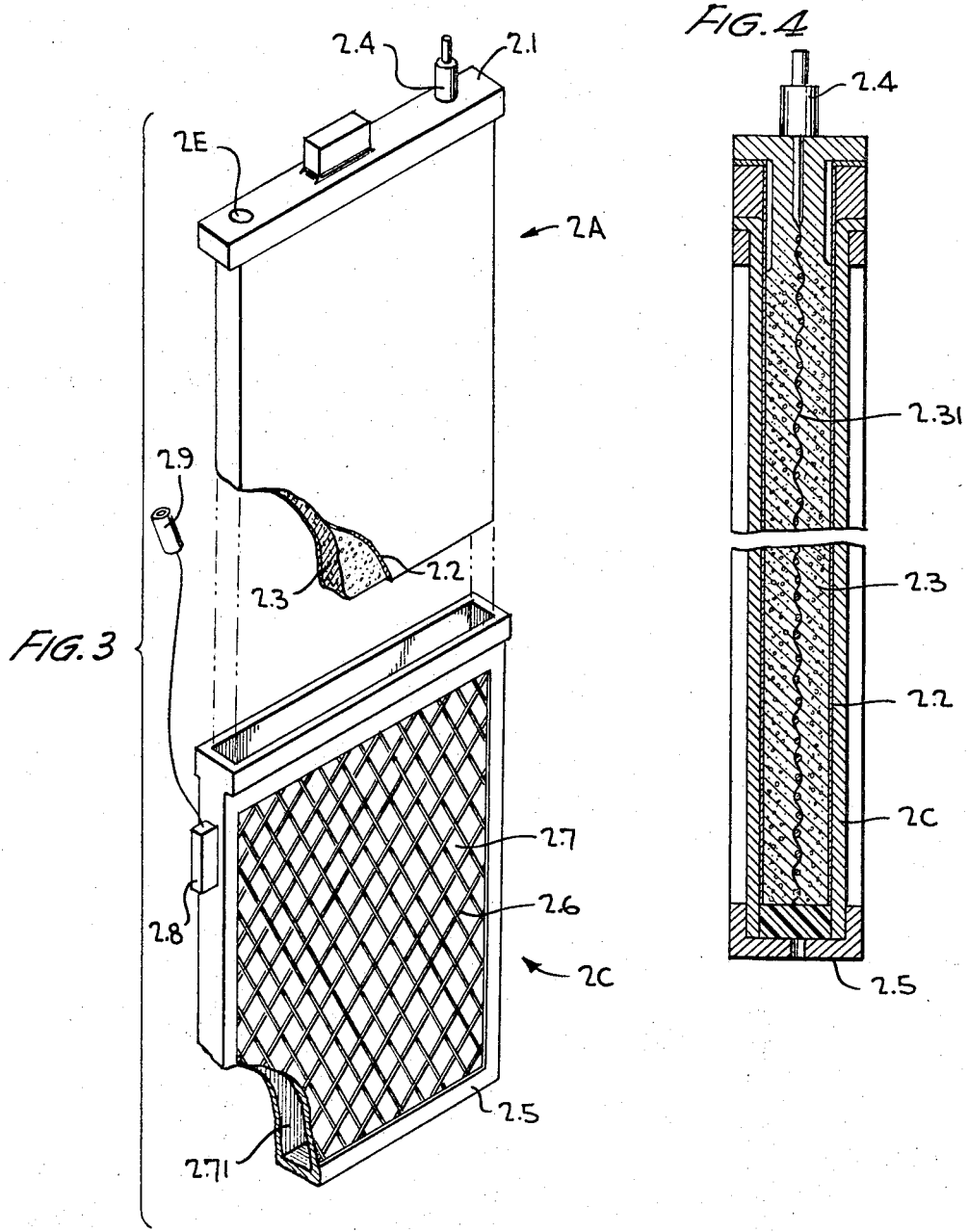

April 16, 1968 M. G. ROSANSKY 3,378,406
METAL-OXYGEN-CONTAINING ELECTROCHEMICAL BATTERY
Filed Dec. 30, 1965
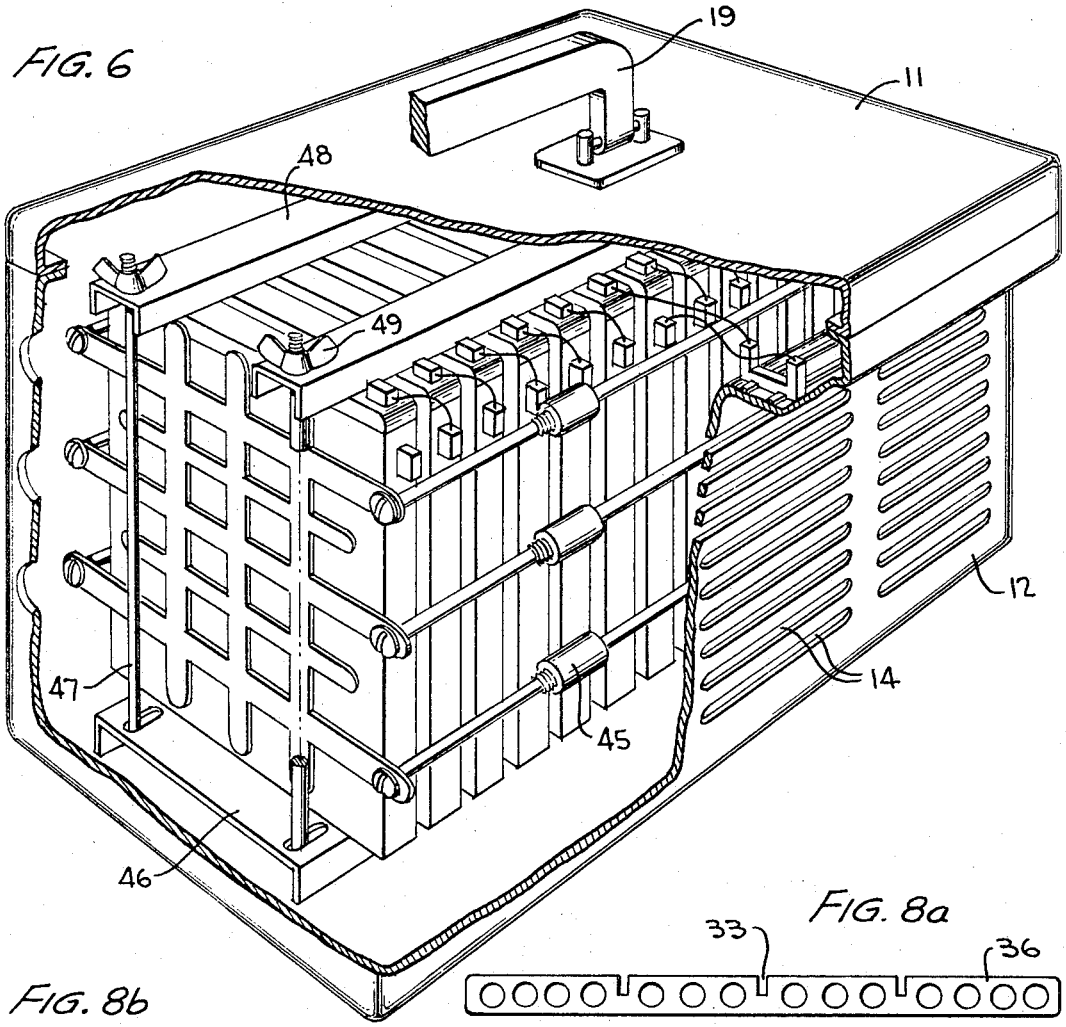
INVENTOR,
MARTIN G. ROSANSKY April 16, 1968 M. G. ROSANSKY 3,378,406
METAL-OXYGEN-CONTAINING ELECTROCHEMICAL BATTERY
Filed Dec. 30, 1965 5 Sheets-Sheet 5

INVENTOR,
MARTIN G. ROSANSKY

United States Patent Office 3,378,406
Patented Apr. 16, 1968

3,378,406
**METAL-OXYGEN-CONTAINING ELECTRO-
CHEMICAL BATTERY**
Martin G. Rosansky, Forest Hills, N.Y., assignor to
Leesona Corporation, Warwick, R.I., a corporation of
Massachusetts
Filed Dec. 30, 1965, Ser. No. 517,604
10 Claims. (Cl. 136—86)

ABSTRACT OF THE DISCLOSURE

A battery comprising a plurality of metal/air or metal/oxygen cells each containing an envelope cathode, a metal anode positioned within the envelope cathode, and an electrolyte in the space separating the cathode and anode, intercell spacers having openings to permit access of air or oxygen to the envelope cathodes between adjacent cells and a support for retaining the plurality of cells, and intercell spacers in operable structural association is described. The envelope cathode comprises a hydrophobic polymeric membrane in contact with a catalytic layer. In operation, air or oxygen passes through the hydrophobic polymeric membrane where it reacts at the catalytic layer with hydroxyl ions being transferred to the anode to complete the electrochemical reaction.

This invention embraces an improved battery of air or oxygen depolarized cells for the electrochemical generation of electrical current. More particularly, the invention is directed to the improved construction of a battery of air or oxygen depolarized cells of the type described in commonly assigned Oswin co-pending application Ser. No. 533,516 filed Mar. 11, 1966, which is a continuation-in-part of Ser. No. 427,623 filed Jan. 25, 1965, now abandoned. The improved battery is a high energy density unit having simplified construction which permits convenient recharging.

There are numerous designs for primary and secondary electrochemical batteries. Most, however, are directed specifically to galvanic-type batteries employing a metal to metal couple such as the nickel-cadmium or silver-zinc batteries. These batteries are completely self-contained, that is, the components which take part in the electrochemical reaction are within the battery. More recently, however, the metal-oxygen or metal-air systems as described by Oswin in the aforesaid co-pending application Ser. No. 427,623 have become increasingly attractive, particularly from the standpoint of obtaining a high energy to density ratio and rapid discharge and re-charge. In order to provide the necessary high energy to density and high energy to volume ratios and, thus be commercially feasible, it is essential to have a battery comprising a plurality of cells in compact relationship. The construction of such batteries is complicated, however, in that the cathode of each cell, during operation, must be accessible to air or oxygen.

Accordingly, it is an object of the present invention to provide a compact battery construction for a metal-air or metal-oxygen cell.

It is another objects of this invention to provide separators and end plates for maintaining a plurality of metal-air or metal-oxygen cells in spaced relationship.

It is another object of this invention to provide a multicell stack, said cells having replaceable anodes, wherein the anodes can be conveniently and rapidly removed and inserted.

These and other objects of the invention will become more readily apparent from the following detailed description, with particular emphasis being placed upon the drawing.

Essentially, the batteries embraced by the present disclosure comprise a plurality of metal-air or metal-oxygen cells which comprise a bi-cathode, an anode, and an electrolyte between the anode and cathode. The bi-cathode is made up of a hydrophobic polymer membrane, such as polytetrafluoroethylene, which is gas permeable but impermeable to liquid, with a catalytic layer thereon which is in contact with the electrolyte of the cell. In operation, air or oxygen passes through the polymer membrane, ionizes at the catalytic layer, accepting electrons and forming hydroxyl ions which are transferred to the anode to complete the electrochemical reaction. A representative reaction where zinc is employed as the anode and the cell fed with oxygen is as follows:

At the cathode:
$$\tfrac{1}{2}O_2 + H_2O + 2e \rightarrow 2OH^-$$
At the anode:
$$Zn + 2OH^- \rightarrow ZnO + H_2O + 2e$$
Total cell reaction:
$$Zn + \tfrac{1}{2}O_2 \rightarrow ZnO$$

It is essential for operation that the cathode of the cell be accessible to air or oxygen.

The improved battery construction of the present invention will be more readily apparent from the following detailed discussion with particular emphasis being placed on the accompanying drawings wherein like numerals are employed to designate like parts throughout, and wherein:

FIGURE 3 is an exploded perspective view, partially in section, of a single cell of the type employed in the present battery having a replaceable anode;

FIGURE 4 is a cross-sectional view showing the anode and cathode in operable association;

FIGURE 6 is a perspective view of a third embodiment of the improved battery construction in partial cross-section;

Figure 9:
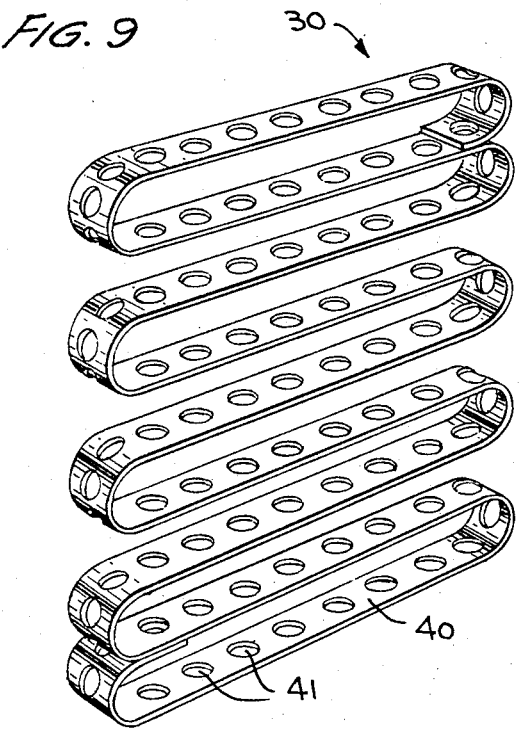
Figure 10:
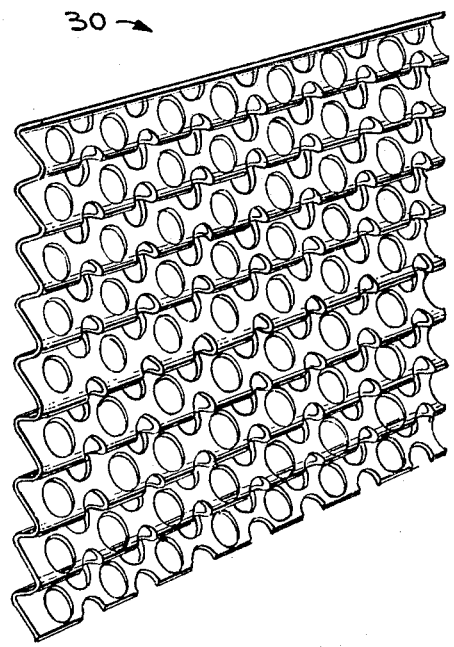
Figure 7:
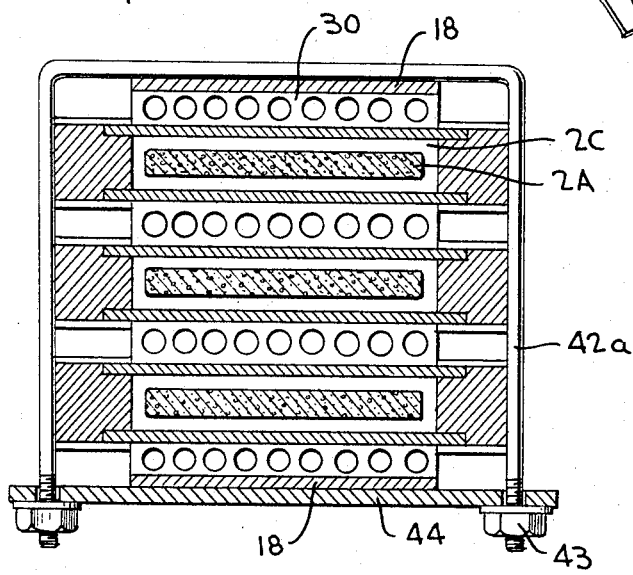

FIGURE 7 demonstrates still another embodiment of the metal-air or metal-oxygen battery employing a U member in construction which holds the components of the stack in operable association and permits rapid replacement of the anode;

FIGURE 8a, b and c illustrate a preferred inter-cell separator;

FIGURES 9 and 10 show modified cell separators.

Figure 1:
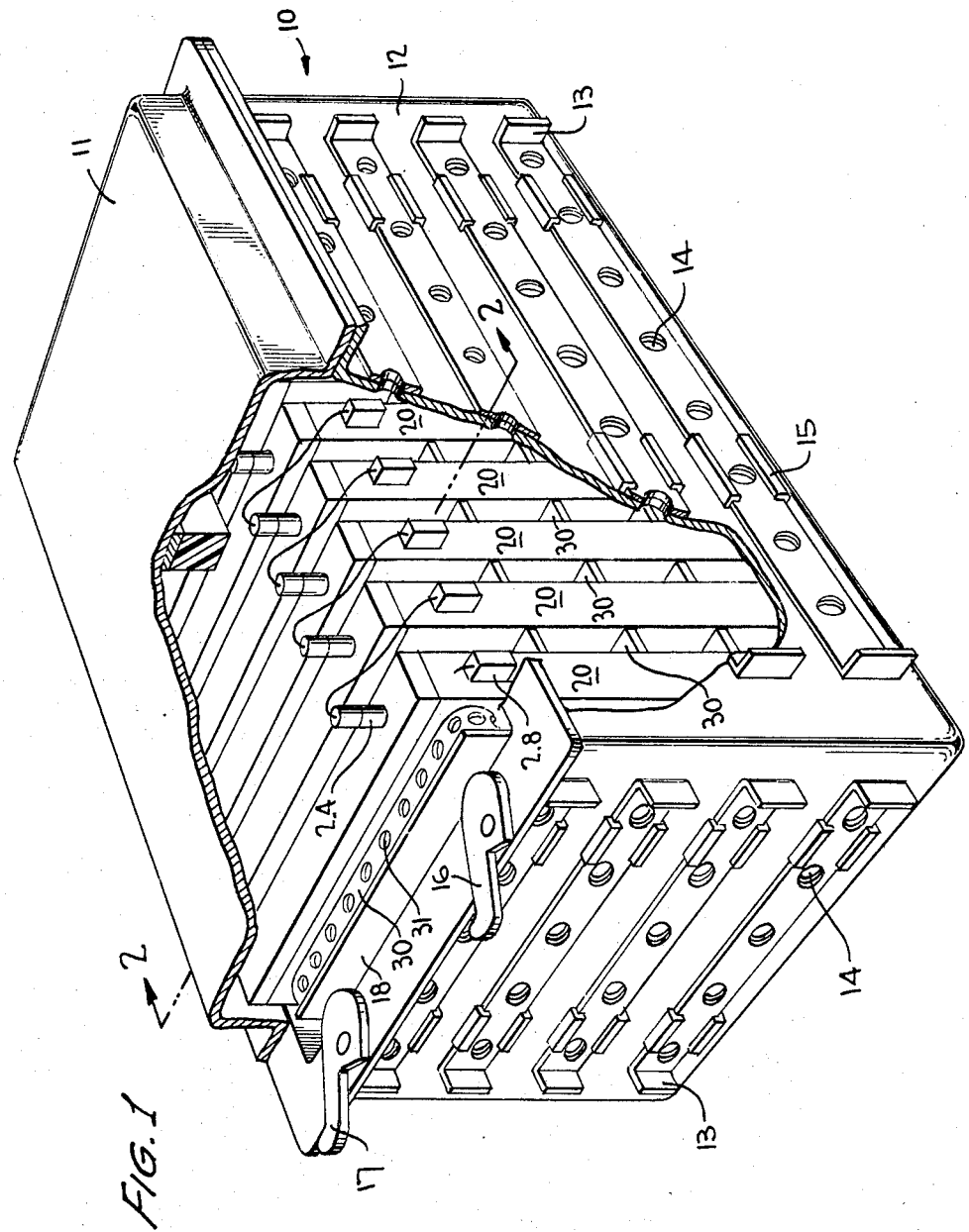
FIGURE 1 is a perspective view of one embodiment of the improved battery construction, with the housing partly broken away, employing a toggle design for holding the components of the stack in operable association and which permits rapid replacement of the anode.

More specifically referring to FIGURE 1 of the drawing, reference numeral 10 is directed to the complete battery comprising casing 12 having cover portion 11. The outer casing 12 contains openings 14 which permit access of air to the internal part of the battery. Openings 14 can be closed when the battery is not in operation by slides 13 mounted in brackets 15. A number of individual cells 20 are mounted within the cell casing and separated by inter-cell spacers 30. The inter-cell spacers as shown more fully in FIGURES 8, 9 and 10, are highly porous to permit access of air between the individual cells and to the bi-cathodes. An end plate 18 is at one end of the cell stack, positioned away from the adjacent cell 20 by means of inter-cell separator 30 having openings 31 to permit passage of air to the cathode. This particular inter-cell separator is seen more fully in FIGURE 9.

Cam lever switches 16 and 17 are shaped to hold the end plate, individual cells and inter-cell spacers in operable contact when in one position, and permit convenient removal of the several components when pivoted to another position.

Figure 2:
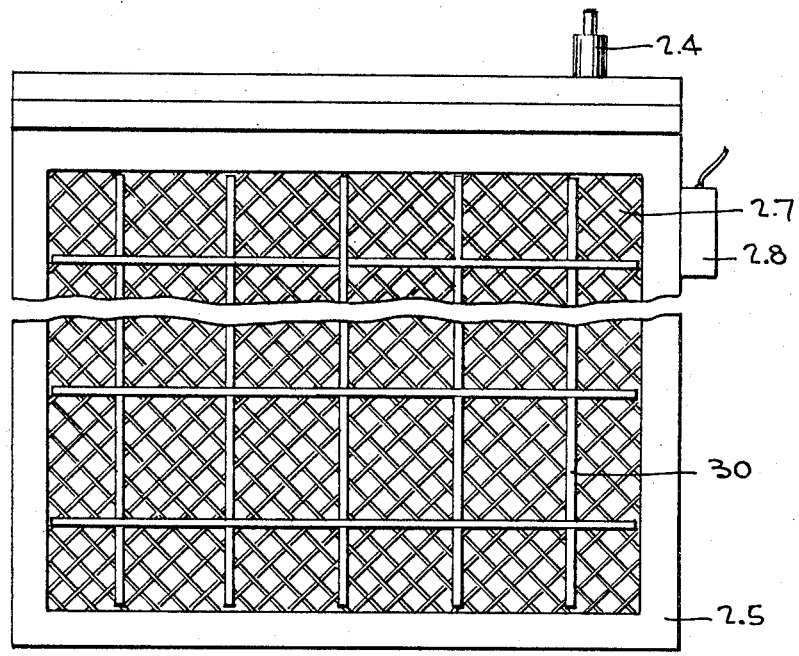
FIGURE 2 is a cross-sectional view taken along line 2—2 of FIGURE 1.

The individual cells are demonstrated more completely in FIGURE 2 which is a sectional view taken along lines 2—2 of FIGURE 1 and FIGURES 3 and 4. Thus, the bi-cathode 2C comprises a frame 2.5, a hydrophobic polymeric membrane 2.7, conductive support screen 2.6 and a catalytic layer 2.71. The support screen 2.6, which serves as well as a current collector, is on the internal surface of the bi-cathode. However, because of the thinness of the polymer membrane, the screen can be seen from the outside. The anode of the cell 2A fits into the bi-cathode and comprises a top portion 2.1 and a porous sinter or sheet metal plate 2.3. The anode can contain a conductive screen 2.31 to improve the strength and conductivity of the anode. Preferably, a glassine paper or the like 2.2 completely covers the anode and electrically insulates the anode from the bi-cathode. If the anode is porous, sufficient electrolyte is added to the cell through port 2E to fill the pores and impregnate separator 2.2. In the event a sheet metal anode is selected, the electrolyte is either filled in the pocket of the bi-cathode and allowed to saturate separator 2.2 after the anode is in place, or the separator 2.2 is saturated with electrolyte prior to the insertion of the anode. Anode lead 2.4 is connected to adjacent cathode lead 2.8 by means of socket 2.9.

Inter-cell supports 30 can be fabricated in various configurations with the essential feature being sufficient porosity to permit access of air to the bi-cathodes. A preferred support is shown in FIGURES 8a, 8b, and 8c. This support comprises a series of plastic bars 35 and 36 having openings 31 and inter-fitting slots 32 and 33 periodically spaced therein. The assembled structure as shown in FIGURE 8c provides the necessary air space and provides structural rigidity to the assembly. Somewhat different inter-cell spacers are shown in FIGURES 9 and 10. The embodiment shown in FIGURE 9 comprises a plastic or metal sheet containing holes. The spacer of FIGURE 10 comprises a porous, corrugated plastic sheet which, while permitting access of air and offering structural support, is relatively flexible.

Figure 5:
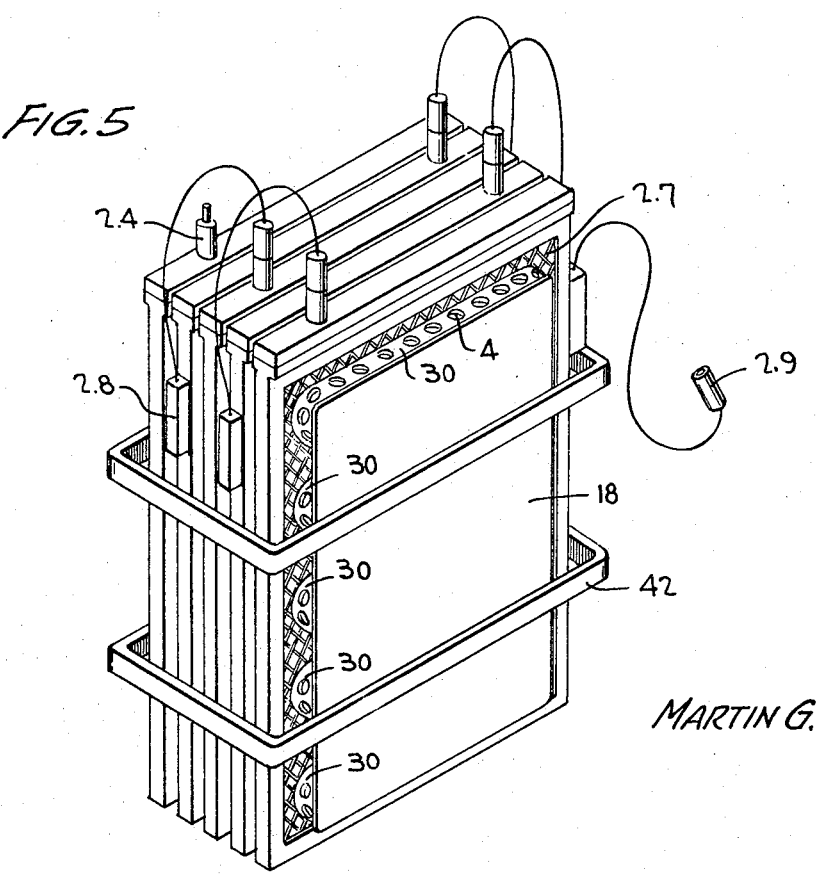
FIGURE 5 is a perspective view of a second embodiment of the improved battery construction showing module supports and end plate construction.

Modifications of the battery assembly shown in FIGURE 1 are depicted in FIGURES 5, 6 and 7. FIGURE 5 illustrates a light weight battery which is approximately 2¾" x 5½" x 3¾" and will draw 6 volts. The battery does not contain an outer casing, but the module is held together by means of end plates 18, inter-cell spacer 30, and support bars 42. The embodiment shown in FIGURE 7 is quite similar to that shown in FIGURE 5 with the exception that the module is held together with U-bolts 42a and end plate 44. The module can be disassembled or the replaceable anodes removed by loosening nut 43. The modification shown in FIGURE 6 is substantially similar to that shown in FIGURE 1 but permits the stacking of a larger number of cells. Thus, the individual cells are contained in structural cooperation by means of lower frame member 46, top frame members 48, bolts 47 fixedly secured by wing nuts 49, and self-adjusting screws 45. As apparent, various modifications can be made to the actual design, and still fulfill the essential utility of the battery.

The bi-cathode as more fully described in the aforesaid co-pending Oswin application Ser. No. 427,623 comprises a hydrophobic polymer membrane which is in contact with a conductive metal support screen or mesh and a catalytic layer. The polymer which is to be used can be any polymeric material which is hydrophobic and permits the passage of gas, but precludes the flow of aqueous materials. Exemplary polymers are the fluorinated hydrocarbons such as polytetrafluoroethylene, polytrifluoroethylene, polyvinylfluoride, polyvinylidenefluoride, polytrifluoroethylene, the hydrophobic co-polymers of two or more of the above materials or co-polymers of such materials with acrylonitrile, methacrylate, polyethylene, and the like. The polymers normally will have a porosity of from about 15 to 85 percent and a uniform pore size distribution of from about 0.01 to about 100 microns, and a thickness of about 0.5 to 10 mils. The catalysts used to coat the hydrophobic polymers are the pure elements, alloys, oxides or mixtures thereof which are effective in promoting an electrochemical reaction. Operable materials include the elements, alloys, oxides, or mixtures of Group I-B, II-B, IV, V, VI, VII and VIII metals of the Mendelyeev's Periodic Table. The metal support screen can be any material which conducts an electrical current and which will withstand the corrosive environment of the battery. Such materials include nickel, zirconium, titanium and tungsten screens, expanded meshes or the like. Moreover, it is possible to apply a hydrophilic polymer or other suitable hydrophilic material such as paper, over the catalytic layer which will be in contact with the electrolyte of the battery when in operation. Furthermore, in order to obtain a greater voltage from a given battery, it can be desirable to insert an insulating material in the bi-cathode to, in effect, provide two distinct cathodes. By connecting the cathodes of the cells in series, it is possible to obtain an increased voltage. Such cathodes as the term is used herein are still considered to be bi-cathodes. As will be apparent, if the cathode is separated by an insulating material, the anodes as well must be separated to form two distinct anodes, or one anode for each cathode.

The anodes which are to be used herein can be any conventional solid electro-conductor employed in a metal-oxygen cell such as metals, metalloids, alloys, and the heavy metal salts. It is only essential that the material selected be chemically reactive with a compatible electrolyte and be more electro-positive than oxygen. Such materials include lead, zinc, iron, cadmium, aluminum and magnesium. From the standpoint of cost, capacity, and convenience, zinc is the preferred material. Although the anode can be in the form of a solid, or substantially solid metal sheet it is preferred that the anode be porous. Porous anodes can be made, for example, by sintering select metal powders.

The cells will operate on conventional electrolytes including the alkaline materials such as sodium hydroxide, potassium hydroxide, mixtures of potassium and rubidium hydroxide and the like. Acid electrolytes including sulphuric acid, phosphoric acid and hydrochloric acid can be employed. As is apparent, depending upon the particular electrolyte used, different anode materials can be selected. It is also feasible, and at times desirable, to employ an electrolyte which is trapped in a suitable matrix such as those made up of hydrophilic polymers, ceramic materials, and the like.

Although the current take off is not shown in the drawings, the current take off can be any conventional plug accessable through the metal casing. A convenient means of taking off the current will be readily apparent to one skilled in the art.

It should be appreciated that the instant invention is not to be construed as being limited by the illustrative embodiments. It is possible to produce still other embodiments without departing from the inventive concept herein disclosed. Such embodiments are within the ability of one skilled in the art.

It is claimed:

1. An improved metal/air or metal/oxygen electrochemical battery comprising a plurality of electrochemical cells each containing an envelope cathode comprising a hydrophobic polymer membrane and a conductive catalytic layer on one major surface of said membrane, said one major surface comprising the inner surface of said cathode, a metal anode positioned within said envelope cathode, and an electrolyte in the space separating the cathode and anode, intercell spacer elements between adjacent cells, said spacer elements having openings therein to permit access of gaseous oxidant to said envelope cathodes, at least one of said spacer elements being arranged in said battery in such manner that said oxidant contacts at least one surface of at least two of said envelope cathodes only through the openings in said spacer elements.

2. The improved battery of claim 1 including means for retaining said plurality of cells and intercell spacer elements in operable structural association, which means comprises at least one U member having an adjustable element on the open end thereof for releasably securing said plurality of cells and intercell spacer elements in operable structural association.

3. The improved battery of claim 1 including means for retaining said plurality of cells and said intercell spacer elements in operable structural association comprising an outer casing having openings therein to permit access of air or oxygen to the envelope cathode.

4. The improved battery of claim 3 wherein the openings in said outer casing are associated with slide means for closing said openings.

5. The improved battery of claim 1 including end plates comprising solid plates separated from the envelope cathodes at either end of said plurality of cells by a plurality of spacer elements having a plurality of gas permeable openings therein.

6. The improved battery of claim 1 wherein the assembly is retained in a housing comprising a container portion and a cover portion, said container portion having openings therein to permit the passage of air.

7. The improved battery of claim 1 wherein the metal anode is removably associated with said envelope cathode.

8. The improved battery of claim 1 wherein the electrolyte of the electrochemical cell is trapped in a matrix.

9. The improved battery of claim 8 wherein the metal anode is zinc, the hydrophobic polymer membrane of the envelope cathode is polytetrafluoroethylene, and an alkaline hydroxide electrolyte is trapped in a paper matrix.

10. The improved battery of claim 9 wherein the catalytic layer on the polytetrafluoroethylene polymer membrane is an admixture of a metal black and colloidal polytetrafluoroethylene.

References Cited
UNITED STATES PATENTS

| | | | |
|---|---|---|---|
| 470,073 | 3/1892 | Ortelli | 136—86 |
| 1,297,157 | 3/1919 | Harris | 204—258 |

ALLEN B. CURTIS, *Primary Examiner.*